US009212601B2

(12) United States Patent
Meinheit et al.

(10) Patent No.: US 9,212,601 B2
(45) Date of Patent: Dec. 15, 2015

(54) DEVICE AND VEHICLE OR PRODUCTION MACHINE

(75) Inventors: Hinrich Meinheit, Besigheim (DE); Boris Buchtala, Muehlacker (DE); Bojan Ferhadbegovic, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 424 days.

(21) Appl. No.: 13/808,834

(22) PCT Filed: May 11, 2011

(86) PCT No.: PCT/EP2011/057573
§ 371 (c)(1),
(2), (4) Date: Mar. 25, 2013

(87) PCT Pub. No.: WO2012/004027
PCT Pub. Date: Jan. 12, 2012

(65) Prior Publication Data
US 2013/0174541 A1    Jul. 11, 2013

(30) Foreign Application Priority Data

Jul. 7, 2010 (DE) .......................... 10 2010 031 033

(51) Int. Cl.
*F02B 33/44* (2006.01)
*F02G 3/00* (2006.01)
*F01K 23/10* (2006.01)
*F16D 31/02* (2006.01)
(Continued)

(52) U.S. Cl.
CPC ................. *F02B 37/04* (2013.01); *B60K 25/02* (2013.01); *F01N 5/04* (2013.01); *F02B 37/00* (2013.01); *F02B 41/10* (2013.01); *B60K 2025/026* (2013.01); *B60Y 2200/221* (2013.01); *B60Y 2200/222* (2013.01); *B60Y 2200/41* (2013.01); *Y02T 10/144* (2013.01); *Y02T 10/16* (2013.01); *Y02T 10/163* (2013.01)

(58) Field of Classification Search
CPC ........... B60K 25/02; F01N 5/04; F02B 37/00; F02B 37/04; F02B 41/10; B60K 2025/026; B60Y 2200/221; B60Y 2200/222; B60Y 2200/41; Y10T 10/144; Y10T 10/16; Y10T 10/163
USPC ................... 60/607–608, 614, 624, 618, 486; 123/561
See application file for complete search history.

(56) References Cited

U.S. PATENT DOCUMENTS 2,968,914 A * 1/1961 Birmann ......................... 60/608
4,083,188 A * 4/1978 Kumm ............................ 60/608
(Continued)

FOREIGN PATENT DOCUMENTS

CN      1690373     11/2005
DE     32 25 388     1/1984
(Continued)

*Primary Examiner* — Thai Ba Trieu
(74) *Attorney, Agent, or Firm* — Kenyon & Kenyon LLP

(57) ABSTRACT

A device for a vehicle or a production machine, having: a first hydraulic pump, which hydraulically drives a load; an internal combustion engine, which mechanically drives the first hydraulic pump; a second hydraulic pump, which is hydraulically coupled to the first hydraulic pump; an apparatus, which drives the second hydraulic pump while utilizing the energy in the exhaust gas stream of the internal combustion engine; the load on the output side being directly connected to a tank.

14 Claims, 3 Drawing Sheets

(51) Int. Cl.
*F02B 33/00* (2006.01)
*F02B 37/04* (2006.01)
*B60K 25/02* (2006.01)
*F01N 5/04* (2006.01)
*F02B 37/00* (2006.01)
*F02B 41/10* (2006.01)

(56) References Cited

U.S. PATENT DOCUMENTS

| | | | | |
|---|---|---|---|---|
| 4,164,119 A | * | 8/1979 | Parquet | 60/428 |
| 4,729,225 A | * | 3/1988 | Bucher | 60/608 |
| 4,763,473 A | * | 8/1988 | Ziplies et al. | 60/431 |
| 4,803,969 A | * | 2/1989 | Hiereth et al. | 123/561 |
| 4,928,487 A | * | 5/1990 | Nikolaus | 60/486 |
| 6,041,602 A | * | 3/2000 | Dickey | 60/605.2 |
| 6,502,398 B2 | * | 1/2003 | Kapich | 60/608 |
| 8,387,386 B2 | * | 3/2013 | Schmeltz | 60/614 |
| 2012/0317965 A1 | * | 12/2012 | Pagnotta, Jr. | 60/327 |
| 2013/0312408 A1 | * | 11/2013 | Murata et al. | 60/605.1 |

FOREIGN PATENT DOCUMENTS

| | | | | |
|---|---|---|---|---|
| DE | 42 12 984 | | 11/1993 | |
| DE | 19732543 A1 | * | 2/1999 | F02B 39/08 |
| DE | 10 2006 010 508 | | 8/2007 | |
| DE | 10 2008 043 221 | | 4/2010 | |
| DE | 102009019383 A1 | * | 11/2010 | B60K 25/04 |
| EP | 0 554 544 | | 8/1993 | |
| JP | 62045923 A | * | 2/1987 | F01N 5/00 |
| JP | 2011202611 A | * | 10/2011 | F02B 41/10 |
| SU | 1267030 A1 | * | 10/1986 | F02G 5/02 |

* cited by examiner

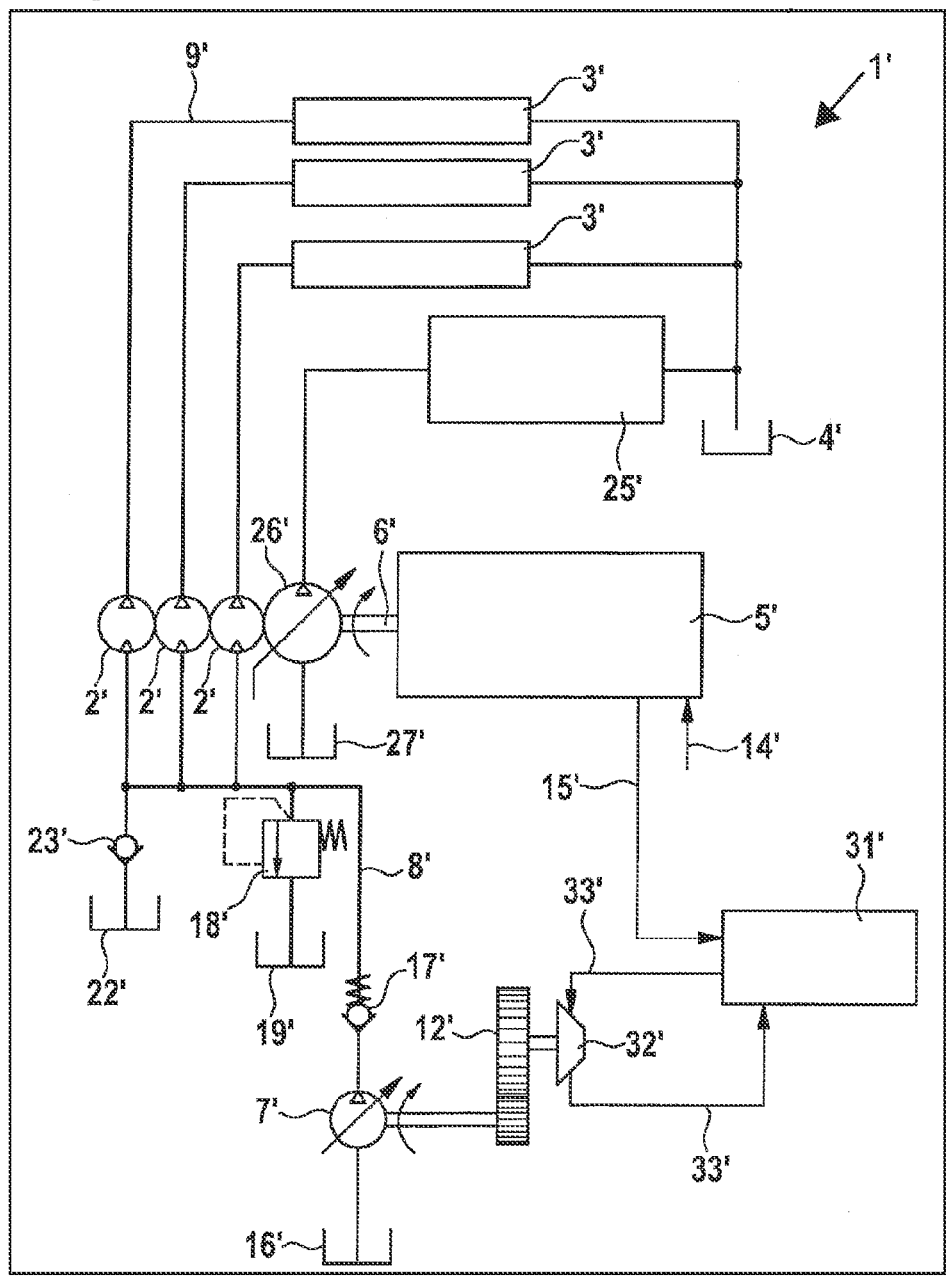

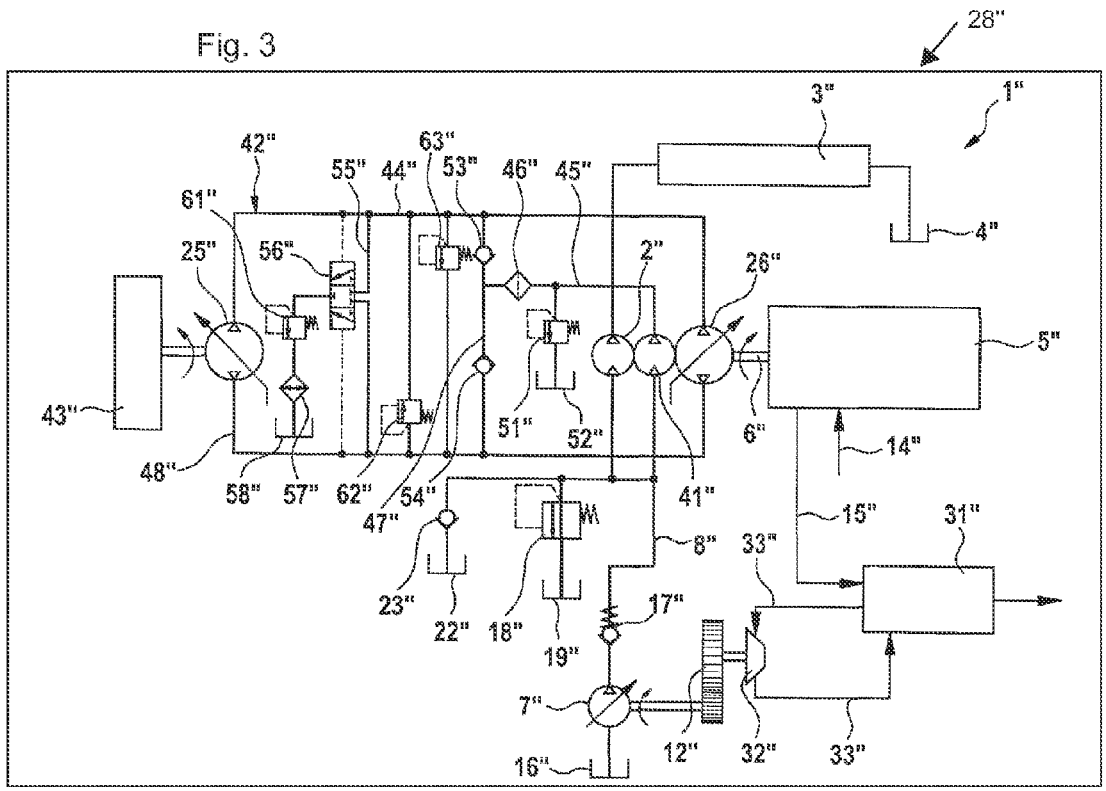

DEVICE AND VEHICLE OR PRODUCTION MACHINE

FIELD OF THE INVENTION

The present invention relates to a device for a vehicle or a production machine as well as a vehicle or production machine.

BACKGROUND INFORMATION

A device according to the definition of the species in Claim 1 is discussed, for example, in German document DE 42 12 984 C2.

The device of DE 42 12 984 C2 has a first hydraulic pump, which drives an hydrostatic motor hydraulically. The hydrostatic motor, in turn, drives several ancillary assemblies using a belt. Furthermore, the device has an internal combustion engine, which mechanically drives the first hydraulic pump using a power train. In addition, a second hydraulic pump is provided which is hydraulically coupled to the first hydraulic pump. The second hydraulic pump is driven by a turbocharger in the exhaust gas stream of the internal combustion engine.

SUMMARY OF THE INVENTION

The device according to the present invention specified herein and the vehicle according to the present invention specified herein or the production machine according to the present invention specified herein have the advantage over the usual design approaches that, because the load is on the output side directly connected to a tank, only a slight regulating effort arises for regulating the first hydraulic pump. For, bringing into line, between the first and second hydraulic pump, the required hydraulic fluid volumes conveyed by them respectively may be extensively omitted in the design approach according to the present invention. For example, the first hydraulic pump could even be provided with a constant absorption volume.

The statement that the "load is on the output side directly connected to a tank" means, in this case, that the first hydraulic pump is operated in an open circuit with the load.

The features indicated in the respective dependent claims relate to advantageous refinements and improvements of the subject matter of the present invention.

According to one refinement of the device of the present invention, a check valve is situated between the first and the second hydraulic pump. On the one hand, the second hydraulic pump oscillates based on the varying exhaust-gas stream of the internal combustion engine, which results in a corresponding oscillation of the hydraulic fluid conveyed by the second hydraulic pump. On the other hand, the first hydraulic pump oscillates based on rotational speed changes of the internal combustion engine which, in turn, results in an oscillation of the hydraulic fluid conveyed by the first hydraulic pump. Using the check valve, an oscillating decoupling is advantageously managed between the first and the second hydraulic pump.

Exemplary embodiments of the present invention are depicted in the drawings and explained in greater detail in the description below.

BRIEF DESCRIPTION OF THE DRAWINGS

FIG. 2 shows a variation of the device according to FIG. 1.

FIG. 3 shows a device according to an additional exemplary embodiment of the present invention.

DETAILED DESCRIPTION

Figure 1:
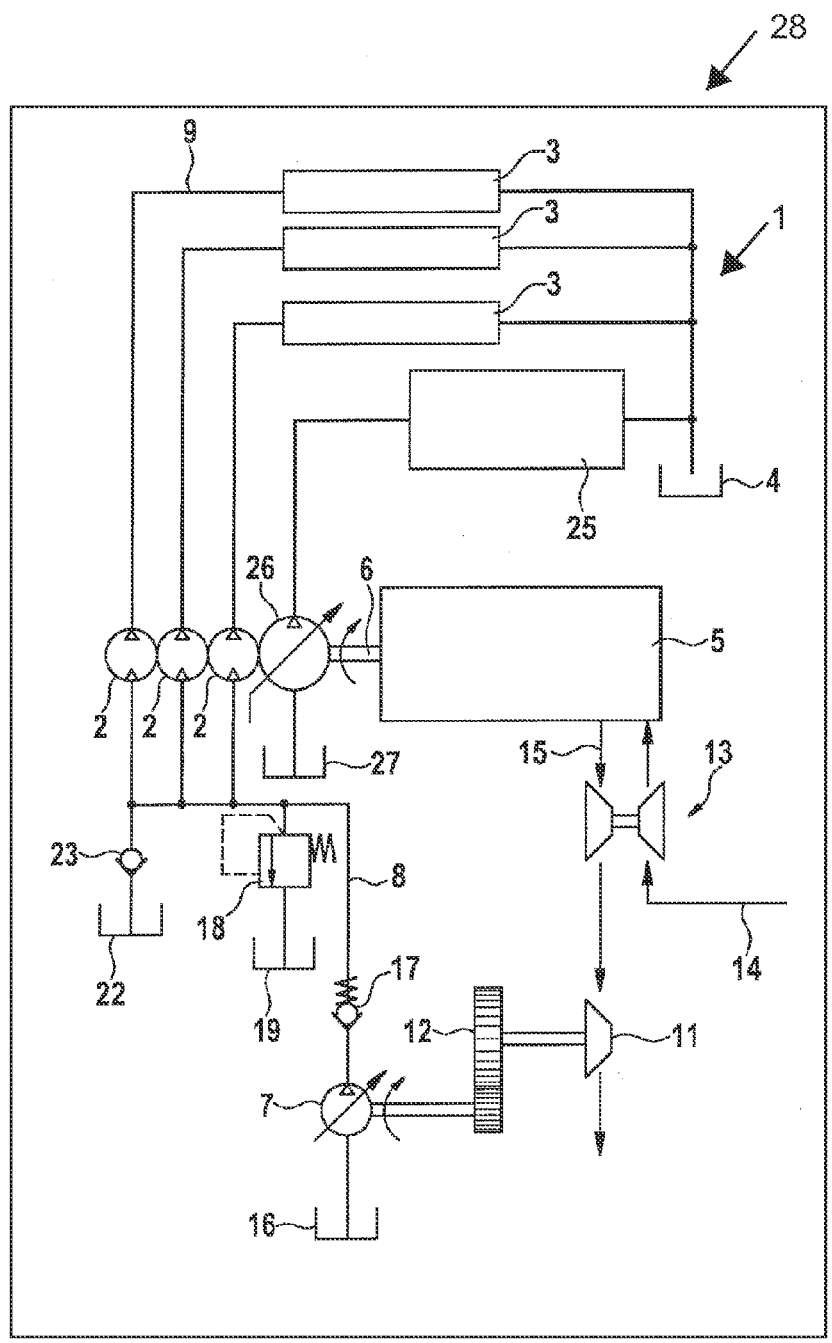
FIG. 1 shows schematically a device according to an exemplary embodiment of the present invention.

In the figures, like or functionally equivalent elements are denoted by like reference numerals, provided that nothing is indicated to the contrary.

FIG. 1 shows a device 1 according to an exemplary embodiment of the present invention.

Device 1 may be integrated, for instance, in a vehicle 28, especially in a motor vehicle or a production machine, such as an excavating machine, a tractor or a harvester combine.

Device 1 has a plurality of hydraulic pumps 2. First hydraulic pumps 2 may have a constant absorption volume. First hydraulic pumps 2 (also designated as auxiliary pumps) each hydraulically drive an auxiliary load 3 using hydraulic lines 9.

The solid lines shown in FIGS. 1 through 3 indicate hydraulic lines. Only for example are two of the hydraulic lines designated by reference numerals 8 or 9.

An auxiliary load 3 typically has an hydraulic motor (not shown) for mechanically driving various auxiliary assemblies, such as a generator, a cooling means pump, a compressed air compressor and/or an air conditioning compressor. The hydraulic motor that is not shown may also drive a blower for cooling engine cooling fluid and hydraulic oil, as well as one or more feed pumps for the actuation of valves of the working hydraulics. The components driven by the hydraulic motor are also not shown in FIG. 1.

As may further be inferred from FIG. 1, auxiliary loads 3 are each connected directly to tank 4 on the output side. This means that first hydraulic pumps 2 supply auxiliary loads 3 with hydraulic fluid in an open circuit.

In addition, device 1 has an internal combustion engine 5. Internal combustion engine 5 includes a shaft 6 by which it particularly drives directly, mechanically first hydraulic pumps 2.

Device 1 further has a second hydraulic pump 7. Second hydraulic pump 7 may have an adjustable absorption volume. Furthermore, second hydraulic pump 7 may be a pressure-regulated or a power-regulated pump. The use of electrohydraulics for controlling second hydraulic pump 7 is not required, based on the low regulating effort required.

Second hydraulic pump 7 is driven by a turbocompound turbine 11 using a transmission 12. In this context, turbocompound turbine 11 is postconnected to a turbocharger 13, for example, which supplies intake air 14 to internal combustion engine 5, and charges it thereby. Turbocharger 13 is driven itself, in turn, by exhaust gas stream 15 of internal combustion engine 5. Exhaust gas stream 15 first flows through turbocharger 13, and after that, through turbocompound turbine 11.

Instead of the postconnected situation of turbocompound turbine 11, the latter could also be used by itself, i.e. without turbocharger 13. Furthermore, turbocompound turbine 11 could also be provided in parallel with turbocharger 13, or preconnected to it.

Turbocompound turbine 11 at present thus develops an apparatus which drives second hydraulic pump 7 while utilizing the energy in exhaust gas stream 15 of internal combustion engine 5. Consequently, second hydraulic pump 7 is able to be driven efficiently.

Using hydraulic line 8, second hydraulic pump 7 pumps hydraulic fluid from a tank 16 through a check valve 17 to the suction side of first hydraulic pumps 2. In order to guard against a possible overpressure in this instance, which could lead to damage of device 1, a pressure limiting valve 18 is provided including a tank 19 between check valve 17 and the suction side of first hydraulic pumps 2.

First hydraulic pumps 2 are furthermore connected on the suction side with a tank 22 using a check valve 23.

Device 1 also has a main load 25. Main load 25 is particularly a production hydraulic system, particularly one or more hydraulic cylinders of the production machine or one or more hydraulic motors for driving the vehicle. For the sake of clarity, at present neither the hydraulic cylinder nor the hydraulic motor is shown in FIGS. 1 and 2.

Moreover, device 1 has a third hydraulic pump 26 (which is also designated as main pump) which is driven mechanically using shaft 6 of internal combustion engine 5.

Third hydraulic pump 26 may be configured having an adjustable absorption volume.

Third hydraulic pump 26 conveys hydraulic fluid from a tank 27 to main load 25 and drives it thereby. Main load 25 on its output side is directly connected to tank 4.

Below, we shall briefly explain the functioning of device 1 in greater detail:

Second hydraulic pump 7 raises the pressure of the hydraulic fluid, which may be an hydraulic oil, for example, on the suction side of first hydraulic pumps 2. Thereby the mechanical power supplied by internal combustion engine 5 using shaft 6 is reduced, which power is required to drive first hydraulic pumps 2. As a result, internal combustion engine 5 is unloaded.

If suddenly more power is demanded of internal combustion engine 5, by supplying it with more fuel, the energy rises noticeably in exhaust gas stream 15, without this resulting immediately in an higher rotational speed of shaft 6 and thus in an higher pumping performance of first hydraulic pumps 2. The higher energy in exhaust gas stream 15 leads to second hydraulic pump 7 taking up more power and thereby making available an higher hydraulic fluid volume on the suction side of first hydraulic pumps 2. In the ideal case this may lead to the suction side pressure of first hydraulic pumps 2 corresponding to their pressure side pressure, the load pressure, so that first hydraulic pumps 2 take practically no power at all from internal combustion engine 5 using shaft 6. Since, in this case, no leakage losses at all occur at first hydraulic pumps 2, the efficiency of device 1 is particularly high in this case. The pressure on the suction side of first hydraulic pumps 2 may also become greater than the load pressure, first hydraulic pumps 2 then going over into motoric operation and unloading the internal combustion engine.

If the pressure at the suction side of first hydraulic pump 2, i.e. in hydraulic line 8, is too high, second hydraulic pump 7 may be swiveled back and/or a volume stream may be led off via pressure limiting valve 18 into tank 19, so that the pressure drops in line 8.

In the reverse case, namely, that internal combustion engine 5 suddenly demands less power, and therefore less fuel is supplied to it, the energy in exhaust gas stream 15 drops suddenly, while the power of internal combustion engine 5 that is output by shaft 6 to first hydraulic pumps 2 still essentially remains constant. This then leads to the situation in which, at the suction side of first hydraulic pumps 2, hydraulic fluid volume provided using second hydraulic pump 7 is not sufficient to cover the hydraulic fluid volume aspirated by first hydraulic pumps 2. In this case, check valve 23 opens, and first hydraulic pumps 2 are thus able to take up additional hydraulic fluid from tank 22.

If second hydraulic pump 7 is designed as a swivel (FOOT) pump, that is, a pump having an adjustable absorption volume, the possibility comes about of a rotational speed regulation of turbocompound turbine 11, so that the latter is able to be operated at the best point of its efficiency characteristics map. The turbine efficiency is a function of the ratio of the pressures before and after turbocompound turbine 11 as well as of the mass flow and the turbine rotational speed. Since turbocompound turbine 11 is aiming at power equilibrium, it is able to be speeded up by a reduction of the swivel angle of second hydraulic pump 7 and its thereby reduced absorption volume, because thereby the load moment drops off.

Check valve 17 advantageously takes care of the aforementioned oscillation technology decoupling between first hydraulic pumps 2 and second hydraulic pump 7.

FIG. 2 shows a possible variant of device 1, and is designated by 1', in a vehicle 28'. In the following, we shall only go into the differences between device 1' and device 1.

Instead of turbocharger 13 and turbocompound turbine 11 according to FIG. 1, device 1' has an heat exchanger 31' and a steam turbine 32'. In heat exchanger 31', steam 33' is generated for driving steam turbine 32', using the energy obtained in exhaust gas stream 15'. Steam turbine 32', in turn, drives second hydraulic pump 7' using gearing 12'.

FIG. 3 shows schematically a device 1" according to an additional exemplary embodiment of the present invention.

It is envisaged that one might typically use device 1" in the case of a mobile production machine, for instance, a tractor 28'''.

Device 1" differs from device 1' of FIG. 2 as follows:

Device 1" has only one first hydraulic pump 2". However, a plurality of first hydraulic pumps 2" could also be provided, of course.

In addition to first hydraulic pump 2", a fourth hydraulic pump 41" is provided. Fourth hydraulic pump 41" is connected on the suction side to second hydraulic pump 7" using hydraulic line 8" and check valve 17". Fourth hydraulic pump 41" is a feed pump, which supplies a closed hydraulic circuit 42" with hydraulic fluid.

In closed hydraulic circuit 42", hydraulic fluid is pumped using third hydraulic pump 26" through a main load 25" developed as an hydraulic motor.

Main load 25" drives a wheel 43" of the tractor. For this, closed hydraulic circuit 42" has hydraulic lines 44" and 48" connecting third hydraulic pump 26" to main load 25".

Fourth hydraulic pump 41" is connected on the suction side to an hydraulic line 47" using hydraulic line 45" and a filter 46".

A pressure relief valve 51" connected to hydraulic line 45" limits the pressure in hydraulic line 45". When there is an overpressure in hydraulic line 45", hydraulic fluid is withdrawn into a tank 52" using pressure limiting valve 51".

Hydraulic line 47" is connected at each end, using a check valve 53" and 54", respectively, to hydraulic line 45" and 48" of hydraulic circuit 42".

Depending on the direction of rotation of main load 25", hydraulic line 44" represents a supply or draining line for the hydraulic fluid. If, for example, hydraulic line 44" is functioning as a supply line, hydraulic line 48" forms a corresponding draining line, and vice versa.

In the operation of main load 25", at its draining side, formed by hydraulic line 44", a part of the hydraulic fluid is drained using hydraulic line 55" and an hydraulic circuit 56", through a cooler 57" into a tank 58". Between cooler 57" and hydraulic circuit 56", an additional pressure limiting valve 61" may be situated.

The drained hydraulic fluid is replaced by the hydraulic fluid followed up by fourth hydraulic pump 41". For this, hydraulic fluid flows, in the present case, from hydraulic line 47" through check valve 53" into draining line 44".

Consequently, filtration and cooling of the hydraulic fluid flowing in hydraulic circuit 42" may be ensured. Also, leakage losses, that are created in hydraulic pump 26" and hydraulic motor 25", are compensated for using hydraulic pump 41".

Furthermore, a pressure limiting valve 62" may be provided, which, in the case of an overpressure, enables the flowing of hydraulic fluid from hydraulic line 48" to hydraulic line 44". Furthermore, a pressure limiting valve 63" may be provided, which, in the case of an overpressure, enables the flowing of hydraulic fluid from hydraulic line 44" to hydraulic line 48".

Instead of heat exchanger 31" and steam turbine 32", in device 1" according to FIG. 3, turbo-charger 13 could also be used with turbocompound turbine 11 of FIG. 1.

Although the present invention was described above specifically with reference to an exemplary embodiment, it is not limited to that, but may be modified in many ways. In particular, the refinements and the exemplary embodiments described for the device according to the present invention are applicable to the vehicle according to the present invention and to the production machine according to the present invention in a corresponding manner. Moreover, it should be mentioned that "ein" (=one or a or an) in the present text does not exclude a plurality.

In the case of the abovementioned hydraulic pumps having constant absorption volume, gear pumps may be involved. Variable displacement pumps may be swash plate pumps or bent axis pumps. The same applies for the abovementioned hydraulic motors.

First hydraulic pumps 2 are also able to be operated as hydraulic motors. This applies particularly in case the hydraulic pressure provided using second hydraulic pump 7 exceeds the hydraulic pressure on the pressure side of first hydraulic pumps 2.

What is claimed is:

1. A device for a vehicle or a production machine, comprising:
    a first hydraulic pump, which hydraulically drives a load, and which is mechanically driven by an internal combustion engine;
    a second hydraulic pump, which is hydraulically coupled to the first hydraulic pump;
    an apparatus, which drives the second hydraulic pump, while utilizing the energy in the exhaust-gas stream of the internal combustion engine;
    wherein the load is connected on an output side directly to a tank.

2. The device of claim 1, wherein a check valve is situated between the first hydraulic pump and the second hydraulic pump.

3. The device of claim 1, wherein the load is an auxiliary load and has an hydraulic motor for the mechanical driving of a battery of at least one of a generator, a cooling pump, an air pressure compressor and an air conditioning compressor.

4. The device of claim 1, further comprising:
    a main load and a third hydraulic pump, which hydraulically drives the main load;
    wherein the internal combustion engine mechanically drives the third hydraulic pump.

5. The device of claim 4, wherein the main load has a working hydraulic system, including at least one of a hydraulic cylinder of the production machine and a hydraulic motor for driving the vehicle.

6. The device of claim 4, wherein the second hydraulic pump is further coupled to a fourth hydraulic pump, which feeds the hydraulic circuit forming the third hydraulic pump with the main load.

7. The device of claim 1, wherein the apparatus has a turbocompound turbine, which is mechanically coupled to the second hydraulic pump for driving the second hydraulic pump.

8. The device of claim 7, wherein:
    the apparatus includes a turbocharger that is driven by the energy in the exhaust-gas stream of the internal combustion engine, and
    the turbocompound turbine is driven by the turbocharger.

9. The device of claim 1, wherein the apparatus has a steam turbine, which is mechanically coupled to the second hydraulic pump for driving the second hydraulic pump.

10. The device of claim 9, wherein the turbocharger is one of: (i) in parallel to the turbocompound, and (ii) preconnected to the turbocompound.

11. The device of claim 1, wherein, when a hydraulic pressure provided using the second hydraulic pump exceeds a hydraulic pressure on a suction side of the first hydraulic pump, at least one of the first, the third and the fourth hydraulic pump is also able to be operated as a hydraulic motor.

12. A vehicle or production machine, comprising:
    a device for a vehicle or a production machine, including:
        a first hydraulic pump, which hydraulically drives a load, and which is mechanically driven by an internal combustion engine;
        a second hydraulic pump, which is hydraulically coupled to the first hydraulic pump;
        an apparatus, which drives the second hydraulic pump, while utilizing the energy in the exhaust-gas stream of the internal combustion engine;
        wherein the load is connected on an output side directly to a tank.

13. The vehicle of claim 12, wherein the device further includes:
    a main load and a third hydraulic pump, which hydraulically drives the main load;
    wherein the internal combustion engine mechanically drives the third hydraulic pump.

14. A device for a vehicle or a production machine, comprising:
    a first hydraulic pump, which hydraulically drives a load, and which is mechanically driven by an internal combustion engine;
    a second hydraulic pump, which is hydraulically coupled to the first hydraulic pump;
    an apparatus, which drives the second hydraulic pump, while utilizing the energy in the exhaust-gas stream of the internal combustion engine;
    wherein the load: (i) is connected on an output side directly to a tank and (ii) is an auxiliary load and has a hydraulic motor for the mechanical driving of a battery of at least one of a generator, a cooling pump, an air pressure compressor and an air conditioning compressor.

* * * * *